United States Patent Office 3,390,144
Patented June 25, 1968

3,390,144
PROCESS FOR THE SELECTIVE REMOVAL OF SUBSTITUTED PHENYLSULFENYL PROTECTIVE GROUPS IN THE SYNTHESIS OF PEPTIDES
Werner Kessler, Loerrach, Baden, Germany, and Beat Iselin, Riehen, Switzerland, assignors to Ciba Corporation, New York, N.Y., a corporation of Delaware
No Drawing. Filed Aug. 24, 1965, Ser. No. 482,281
Claims priority, application Switzerland, Sept. 10, 1964, 11,803/64; Jan. 26, 1965, 1,067/65; Aug. 6, 1965, 11,108/65
20 Claims. (Cl. 260—112.5)

ABSTRACT OF THE DISCLOSURE

A process for the synthesis of peptides, in which the α-amino protecting group or groups is a sulfenyl group (e.g. o-nitrophenylsulfenyl) which is selectively eliminated by treatment in a weakly acid medium with a compound containing di- or tetra-valent nucleophilic sulfur or with hydrazoic or hydrocyanic acid or a salt thereof or with a salt of hydriodic acid, especially an alkali metal salt. The process may be carried out, if desired, by solid phase synthesis.

In synthesising peptides by coupling amino acids or peptides it is as a rule necessary to protect any functional groups not participating in the coupling reaction. Thus, for example, carboxyl groups can be blocked by esterification, the mercapto group by benzylation or tritylation. For protecting the amino groups there may be used the carbobenzoxy group or colored protective groups derived from it, the toluenesulfonyl group, the phthalyl and formyl residue, the tertiary butyloxycarbonyl group, the trityl group and others. The groups used for blocking must be eliminable towards the end of the synthesis without interference with the molecule. When a peptide is synthesized in several stages, one protected amino or carboxyl group must be liberated again after each condensation reaction to enable a further amino acid derivative (or further peptide) to be fused on in the released position, whereas all other protective groups, above all also those in the side chains, should remain intact. Accordingly, the group mentioned must lend itself to selective elimination.

The term peptide as used herein means peptides built up from natural α-amino acids, i.e. amino acids obtainable by degradation of proteins and peptides occurring in nature. The term amino acid means natural α-amino acids. By derivatives of amino acids or peptides are understood esters thereof, especially lower alkyl esters such as methyl, ethyl, propyl, tertiary butyl ester, unsubstituted and substituted benzyl esters, the substituents being one or more and selected from the group consisting of lower alkoxy, for instance methoxy, ethoxy, halogen, for instance chlorine, or the nitro group, and substituted phenyl esters, having the same substituents, especially p-nitrophenyl esters, further the (unsubstituted) amide and hydrazide, and corresponding compounds in which functional groups, for instance amino groups, carboxyl groups, mercapto groups, are protected by protective groups known for such purpose, especially the tertiary butyloxycarbonyl group, the trityl group and sulfenyl groups.

According to one variant of the peptide synthesis which is preferably used to prevent racemization the peptide is synthesized starting from the carboxyl end, by successively fusing on the individual amino acids whose α-amino group is protected and eliminating the α-amino protecting group after each condensation step. A new process of this nature is the so-called "solid phase synthesis" in which the terminal carboxyl group is linked by an ester bond with a polymer containing hydroxyl groups, for example a copolymer of styrene and divinylbenzene, which is partially substituted by hydroxymethyl groups (see Merrifield, J. Am. Chem. Soc. 85, page 2149 [1963]).

Coupling methods that have proved satisfactory in the synthesis from the carboxyl end is the method of the activated esters, the method of the mixed anhydrides and the carbodiimide method. However, the choice of suitable protective groups is difficult, especially when the peptide contains functional groups in the side chain. The carbobenzoxy group—which may be eliminated by hydrogenolysis selectively from different other protective groups, for example tertiary butyloxycarbonyl or trifluoroacetyl—is unsuitable when the peptide to be synthesized contains amino acids comprising sulfur such as methionine or cysteine. Groups eliminable by strong alkaline agents, such as sodium in liquid ammonia, for example toluenesulfonyl, can in general not be used for long-chain delicate peptides. Also strong acid agents, for example hydrochloric acid which is required for eliminating the formyl group, generally attack the peptide very strongly. The trityl group, which can be eliminated with acids under mild conditions, cannot be used because of the steric hindrance in the coupling reaction by the method of the activated esters and the mixed anhydrides (except with glycine) and gives also in the carbodiimide method poor yields. Further disadvantages of the trityl group are the difficulties experienced in their introduction and the instability of trityl-protected compounds.

Zervas et al. now have proposed to use as an α-amino protecting group in peptide syntheses the sulfenyl group, for example triphenylmethylsulfenyl or ortho-nitrophenylsulfenyl (see J. Am. Chem. Soc. 85, page 3660 [1963]). Like the trityl group, the sulfenyl group is eliminable under mild acid conditions, but it does not possess the unfavorable properties of the trityl residue insofar as introduction, stability and coupling are concerned. Further advantages are the very good crystallizing property of the sulfenyl derivatives and the color of nitrophenylsulfenyl derivatives.

The elimination of the sulfenyl group can be achieved according to Zervas with hydrogen chloride in alcohol or non-polar solvents, at room temperature.

However, it has been found in the case of larger peptides which contain in the side chain protective groups which are eliminable in acidic medium, for example the tertiary butyloxycarbonyl group, that with the elimination of the sulfenyl group the side chain protective group, particularly the tertiary butyloxycarbonyl group, is also partially eliminated. Zervas also suggests acetic acid for elimination of the sulfenyl group; but elimination takes place very slowly and numerous conversion products of the sulfenyl radical are formed thereby, yielding a very impure product which can only difficultly be purified.

The present invention is based on the observation that the sulfenyl group lends itself much more readily and better to selective elimination by treating in a weakly acid medium an amino acid derivative containing such an amino protecting group with a compound containing di- or tetravalent nucleophilic sulfur or with hydrazoic or hydrocyanic acid or a salt thereof or with a salt of hydroiodic acid, especially with an alkali metal salt.

The sulfenyl protective group is a compound of the formula R—S—, where R represents an aryl, for instance naphthyl, especially phenyl radical, that is preferably substituted by negative substituents. The sulfenyl group is above all an ortho-nitrophenyl, or ortho, para-dinitrophenyl or pentachlorophenyl sulfenyl group.

The nucleophilic sulfur compounds to be used may be inorganic or organic. Suitable inorganic ones are: thiosulfuric acid, sulfurous acid, hydrogen sulfide and thiocyanic acid, and salts, especially alkali metal salts thereof.

These compounds, as well as hydrocyanic acid form mixed anhydrides together with the sulfenyl radical, of the general formula R—S—A, in which R has the meaning given above and A represents the anion of an acid mentioned above, whereas in the cases of hydrazoic acid and the iodide disulfides of the formula R—S—S—R, in which R has the meaning given above, are formed. Since the solubilities of the anhydrides and disulfides differ from those of the peptide derivatives, separation from the latter present no difficulty.

Suitable organic nucleophilic sulfur compounds are mercapto compounds and compounds convertible into mercapto compounds by tautomerization, particularly those in which the mercapto group is attached to an unsaturated carbon atom, primarily aromatic mono- or di-thiols which may also be substituted, for example, by lower alkyl or lower alkoxy groups or halogen atoms as for instance 3,4-dimercaptotoluene, also thiocarboxylic acid derivatives, especially thioamides, for example, thioacetamide or thiobenzamide, and thiocarbonic acid derivatives, such as thiocarbamic acid derivatives, e.g. thiourethanes and primarily unsubstituted or substituted thiourea, for example, phenyl- or diphenyl-thioureas. Other suitable mercapto compounds are, for example, thioacetic acid, thioglycollic acid, and dithioglycol.

The reaction is performed in a weakly acid reaction medium, for example, at a pH of 3–6.5. The reaction medium may be weakly acid either through the acidity of the nucleophilic compound itself or it may be rendered weakly acid by the addition of a weakly acid compound, for example, of a weak organic acid, such as a lower alkanoic acid, especially acetic acid.

The reaction of this invention proceeds very rapidly and completely even at room temperature. No by-products that are difficult to separate are formed, especially not when hydrocyanic acid is used. It is a special advantage of the present process that it makes it possible to eliminate the sulfenyl group selectively in the presence of acid-labile groups, for example the tertiary butyloxycarbonyl, the trityl or the tertiary butyl ester group, without any attack whatsoever on these groups taking place. Therefore, in the synthesis of peptides that contain basic amino acids such as lysine or ornithine, the amino groups in the side chain may be protected by the tertiary butyloxycarbonyl group, and the α-amino group of the aminoacid to be fused on or of the peptide to be fused on can be protected by the sulfenyl group. After the condensation the α-amino protective group of the peptide formed by the present process can be eliminated while leaving the tertiary butyloxycarbonyl groups completely intact. Likewise, the sulfenyl group can be selectively eliminated in the presence of a mercapto group protected by a trityl group or a carboxyl group protected by the tertiary butyl ester group. The aforementioned use of the Nα-sulfenyl protecting group side by side with the tertiary butyloxycarbonyl group for protecting amino groups in the side chain is particularly suitable also for the solid phase synthesis. For this purpose preferred use is made of thioacetamide or thiourea because in such a case the reaction proceeds particularly rapidly.

The following examples illustrate the elimination of the sulfenyl group from different amino acids. In the same manner the sulfenyl group can be eliminated from peptides protected by sulfenyl groups. Further examples illustrate the synthesis of peptides with the use of the sulfenyl protective group, above all also in the presence of the tertiary butyloxycarbonyl group.

Example 1.—L-valyl-L-phenylalanine methyl ester hydrochloride from ortho - nitrophenylsulfenyl - L - valyl-L-phenylalanine methyl ester 0.4 g. (0.93 millimol) of ortho-nitrophenylsulfenyl-L-valyl-L-phenylalanine methyl ester (see J. Am. Chem. Soc. 85, pages 3660 et seq. [1963]) is dissolved in 20 ml. of a 5.6% 2 N-solution of hydrocyanic acid in methanol. The clear, yellow solution is mixed with 5 ml. of glacial acetic acid and kept for 16 hours at room temperature in a stoppered flask, whereupon a specimen of the solution, which has now become much lighter, subjected to thin-layer chromatographic analysis reveals that the ortho-nitrophenyl protective group has been completely eliminated. The reaction mixture is evaporated almost to dryness under vacuum, the residue is taken up with 20 ml. of dry ether and the light-yellow, almost clear solution is mixed with 2 ml. of a 2 N-solution of hydrogen chloride in ethyl acetate. The resulting oily precipitate solidifies in crystalline form on trituration. The solid matter is filtered off, stirred with 10 ml. of dry ether and once more filtered. In this manner there are obtained 230 mg. (=78.8% of theory) of chromatographically pure L-valyl-L-phenylalanine methyl ester hydrochloride melting at 197° to 199° C.

The filtrates yield on evaporation 163 mg. (=96.7% of theory) of light-yellow, almost pure orthonitrophenylthiocyanate melting at 130° to 132° C. which contains only a trace of L-valyl-L-phenylalanine methyl ester hydrochloride.

Example 2.—N$^\epsilon$-tertiary butyloxycarbonyl-L-lysine methyl ester acetate from N$^\alpha$-ortho-nitrophenylsulfenyl-N$^\epsilon$-tertiary-butyloxycarbonyl-L-lysine methyl ester 1.24 g. (3 millimols) of N$^\alpha$-ortho-nitrophenylsulfenyl-N$^\epsilon$-tertiary butyloxycarbonyl-L-lysine methyl ester are dissolved in 60 ml. of a 5.6% 2 N-solution of hydrocyanic acid in methanol. The clear, yellow solution is mixed with 15 ml. of glacial acetic acid and kept for 16 hours at room temperature in a stoppered flask. The thin-layer chromatographic analysis of a specimen of the solution reveals that the ortho-nitrophenylsulfenyl protective group has been completely eliminated, whereas the tertiary butyloxycarbonyl protective group has not been affected. The reaction mixture is then evaporated almost to dryness under vacuum, and the residue is taken up with 50 ml. of ether and 5 ml. of 2 N-acetic acid. The aqueous layer is separated and the ether layer (I) extracted with 2× 5 ml. of 2 N-acetic acid. The combined aqueous acetic acid extracts are concentrated under vacuum to an oily syrup which is freed from water and acetic acid by being stirred with 2× 5 ml. of benzene and both times evaporated to dryness. After having been dried in a high vacuum at 30° C. the oily residue solidifies and forms a colorless crystalline mass which is stirred with ether and filtered, to yield 0.54 g. (=56.4% of theory) of N$^\epsilon$-tertiary butyloxycarbonyl-L-lysine methyl ester acetate (II) as a white crystalline powder melting at 79° to 81° C. When the ether filtrate is concentrated, the precipitated crystals are filtered off and washed with ether, a second fraction of II (245 mg.=27.6% of theory) is obtained in the form of a faintly brownish crystalline powder melting at 77° to 79° C. According to their thin-layer chromatograms on silical gel in the system I (=tertiary amyl alcohol+isopropanol+water, 100:40:10) the two fractions are unitary (Rf=0.35). More especially, no L-lysine methyl ester or L-lysine (Rf=0.0 in the indicated system for both substances) can be identified.

The ether phase I is dried over sodium sulfate and evaporated, to yield 0.56 g. (=100% of theory) of ortho-nitrophenylthiocyanate melting at 130° to 133° C. which still contains traces of N$^\epsilon$-tertiary butylcarbonyl-L-lysine methyl ester.

The starting material can be prepared thus:

(a) While stirring and gradually heating to 40° to 45° C. a suspension of 4.08 g. 7.4 millimols) of the copper (II) complex of N$^\epsilon$-tertiary butyloxycarbonyl-L-lysine in 37.2 ml. of 2 N-sodium hydroxide solution, it is mixed with a total of 2.22 g. (14.76 millimols) of D-tartaric acid in several portions. After about 30 minutes a clear, deep blue solution has formed to which 0.55 g. (7.38 millimols) of thioacetamide is added portionwise. The precipitated, dark brown copper sulfide is filtered off through Celite and the clear, faintly yellowish solution is concentrated to 30 ml. 75 ml. of dioxane and then 3.2 g. (17 millimols) of orthor-nitrophenylsulfenyl chloride are added in several portions. The dark green suspension is stirred for 15 minutes at room temperature, then diluted with 150 ml. of water, filtered, covered with 150 ml. of ether and extracted. The ethereal layer is discarded, and the aqueous phase is once more extracted with 150 ml. of ether and then adjusted with N-sulfuric acid at 0° C. to pH=1 to 2. The solution is immediately extracted with 2× about 150 ml. of ice-cold ether. The ethereal extracts are washed with 100 ml. of saturated sodium chloride solution until neutral, dried over magnesium sulfate and concentrated to about 30 ml. The clear, deep yellow solution is then mixed with 3.5 ml. (19 millimols) of dicyclohexylamine, whereupon crystallization sets in at once. After standing for a short time, the crystals are filtered off, copiously washed with dry ether and dried, to yield 7.59 g. (=88.5% of theory of $N^\alpha$-ortho-nitrophenylsulfenyl-$N^\epsilon$-tertiary butyloxycarbonyl-L-lysine dicyclohexyl ammonium salt melting at 198° to 201° C. After recrystallization from methanol the substance melts at 197.5° to 198.5° C. It is chromatographically pure.

(b) The free acid is prepared from 3.98 g. (6.87 millimols) of the above salt with the use of aqueous citric acid in ethyl acetate. The acid is then dissolved in 10 ml. of dry ether and the solution is mixed with 15.3 ml. of an 0.46-molar ethereal solution of diazomethane. The reaction mixture is kept for 15 minutes at room temperature, then washed with water, N-citric acid and N-potassium bicarbonate and water, the ethereal solution is dried over sodium sulfate and evaporated to dryness, to yield 2.82 g. (99.3% of theory) of $N^\alpha$-ortho-nitrophenylsulfenyl-$N^\epsilon$-tertiary butyloxycarbonyl-L-lysine methyl ester. After recrystallization from ether+petroleum ether the substance melts at 71° to 72° C. Optical rotation $$[\alpha]_{20}^D = -32 \pm 0.4°$$

(c.=3%, in dimethylformamide). The compound is chromatographically pure.

Example 3.—$N^\epsilon$-tertiary butyloxycarbonyl-L-lysyl-$N^\epsilon$-tertiary butyloxycarbonyl-L-lysine methyl ester monochloracetate from $N^\alpha$-ortho-nitrophenylsulfenyl-$N^\epsilon$-tertiary butyloxycarbonyl - L - lysyl - $N^\epsilon$ - tertiary butylcarbonyl-L-lysine methyl ester 0.32 g. (0.5 millimol) of $N^\alpha$-ortho-nitrophenylsulfenyl-$N^\epsilon$ - tertiary butyloxycarbonyl - L - lysyl - $N^\epsilon$ - tertiary butyloxycarbonyl-L-lysine methyl ester is dissolved in 15 ml. of a 5.6% (2 N-)solution of hydrocyanic acid in methanol. 3.8 ml. of glacial acetic acid are added and the mixture is kept in a stopppered flask for 20 hours at room temperature. The thin-layer chromatographic examination of a specimen of the solution reveals that all starting material has disappeared. The clear, light-yellow solution is mixed with 1.0 ml. of a 4.73% solution (0.5 millimol) of monochloroacetic acid in methanol and concentrated under vacuum at 25° C. almost to dryness. The residue is taken up with 30 ml. of ether and 30 ml. of 2 N-acetic acid, the aqueous layer is separated and the ether phase (I) extracted with 2× 30 ml. of acetic acid. The clear, almost colorless aqueous fractions are combined and evaporated in a high vacuum at 25° C. After about 6 hours' drying in a high vacuum over phosphorus pentoxide and potassium hydroxide there are obtained 0.29 g. (100% of theory) of a faintly yellowish oil which on thin-layer chromatography in three solvent systems proves to be unitary. It is $N^\epsilon$-tertiary butyloxycarbonyl-L-lysyl-$N^\epsilon$-tertiary butyloxycarbonyl-L-lysine methyl ester monochloracetate.

The ether fraction I is dried over sodium sulphate and evaporated, to yield 0.12 g. of faintly yellowish ortho-nitrophenylthiocyanate melting at 118° to 126° C.

The starting material can be prepared thus:

A suspension of 0.64 g. (2.0 millimols) of $N^\epsilon$-tertiary butyloxycarbonyl-L-lysine methyl ester acetate in 10 ml. of ethyl acetate is agitated once at 0° C. with 5 ml. and then once with 3 ml. of ice-cold 2 N-potassium carbonate solution; the ethyl acetate solution is washed with 3 ml. of saturated sodium chloride solution, dried over sodium sulfate and evaporated to dryness under vacuum at 30° C. There are obtained 0.54 g. of $N^\epsilon$-tertiary butyloxycarbonyl-L-lysine methyl ester (free base) as a colorless oil which is dissolved in 15 ml. of pure acetonitrile, 2.16 millimols of $N^\alpha$-ortho - nitrophenylsulfonyl - $N'$ - tertiary butyloxycarbonyl-L-lysine are added; the clear, yellow solution is cooled to −15° C. and mixed with a solution, cooled at −15° C., of 0.62 g. (3.0 millimols) of dicyclohexylcarbodiimide in 4 ml. of acetonitrile. The mixture is stirred for 30 minutes at −15° C. and then kept for 3 days at 0° C. The dicyclohexylurea which has settled out is filtered off, the yellow filtrate completely evaporated at 40° C., and the residue taken up in 20 ml. of warm ethyl acetate. After further dicyclohexylurea has been filtered off and washed with N-aqueous citric acid solution, N-potassium bicarbonate solution and water, the clear, yellow ethyl acetate layer is dried over sodium sulfate and evaporated. The foamy residue crystallizes rapidly when triturated with a small amount of ethyl acetate. On recrystallization from ethyl acetate+petroleum ether the crystalline mass yields 0.87 g. (=68.2% of theory) of pure $N^\alpha$-ortho-nitrophenylsulfenyl-$N^\epsilon$-tertiary butyloxycarbonyl-L-lysyl-$N^\epsilon$-tertiary butyloxycarbonyl-L-lysine methyl ester melting at 144° to 146° C. From the mother liquor a further 1.134 g. (10.4% of theory) of a slightly less pure substance melting at 141° to 143° C. can be isolated.

Example 4.—Eliminating the ortho-nitrophenylsulfenyl (NPS) protective group with a weakly acetic acid sodium thiosulfate solution A solution of 20 mg. of ortho-nitrophenylsulfenylglycine in 0.8 ml. of methanol is mixed with 0.1 ml. of a molar sodium thiosulfate solution and then with 0.1 ml. of glacial acetic acid. The solution is initially deep yellow and then, on addition of glacial acetic acid, it turns suddenly light greenish yellow. The solution is kept for 5 minutes at room temperature; a specimen is then applied to silica gel thin-layer plates and immediately chromatographed. The only ninhydrin-positive substance that can be identified is glycine; Rf=0.05 in system I. Ortho-nitrophenylsulfenylglycine (Rf=0.30) cannot be detected.

The NPS groups of the amino acids and peptides and, respectively their esters, shown in the table are eliminated in a similar manner. The Rf values have been measured in system I.

TABLE

| Starting material: | Rf |
|---|---|
| NPS-L-proline | 0.32 |
| NPS-L-valine | 0.39 |
| NPS-glycine ethyl ester | 0.70 |
| NPS-glycyl-L-phenylalanine methyl ester | 0.69 |
| NPS-L-valyl-L-phenylalanine methyl ester | 0.73 |
| Fission product: | |
| L-proline | 0.05 |
| L-valine | 0.13 |
| Glycine ethyl ester | 0.16 |
| Glycyl-L-phenylalanine methyl ester | 0.31 |
| L-valyl-L-phenylalanine methyl ester | 0.42 |

In all cases the elimination of the ortho-nitrophenylsulfenyl protective group is complete after 5 minutes. When acetic acid (75%) alone is used, complete elimination is achieved only after 24 hours; with a mixture of methanol and glacial acetic acid (8:1) practically no elimination occurs.

The starting materials can be prepared thus:

A suspension of 0.45 g. (2 millimols) of ortho-nitrophenylsulfenylglycine and 0.43 g. (2 millimols) of L- phenylalanine methyl ester hydrochloride in 15 ml. of dry acetonitrile is mixed with 0.28 ml. (0.20 g.=2 millimols) of triethylamine. The yellow suspension is then mixed with 5 ml. of amine-free dimethylformamide and the mixture is cooled to −5° C., and a cold solution of 0.45 g. (2.2 millimols) of dicyclohexylcarbodiimide in 4 ml. of acetonitrile is stirred in. The reaction mixture is stirred for 30 minutes at −5° C. and then kept overnight (for about 16 hours) at 0° C. 0.1 ml. of glacial acetic acid is stirred in at 5° C., the whole is left to itself for one hour, and the dicyclohexylurea is filtered off. The yellow filtrate is evaporated under vacuum, the oily, yellow residue taken up with about 10 ml. of ethyl acetate, the dicyclohexylurea is filtered off and washed with N-aqueous citric acid solution, N-sodium bicarbonate solution and saturated sodium chloride solution, dried over sodium sulfate and evaporated, to leave 0.82 g. of a yellow oil which crystallizes from benzene+petroleum ether, to yield 0.163 g. of a yellow, crystalline substance melting at 98° to 100° C., and, after recrystallization from acetone+petroleum ether, at 101° to 102° C. Optical rotation $[\alpha]_{20}^D = -5° \pm 0.5°$ (c.=2%, in dimethylformmide).

Example 5.—Eliminating the ortho-nitrophenylsulfenyl protective group with weakly acetic acid sodium thiosulfate solution in the presence of the tertiary butyloxycarbonyl (BOC) protective group A solution of 20 mg. of $N^\alpha$-ortho-nitrophenylsulfenyl-$N^\epsilon$-tertiary butyloxycarbonyl-L-lysine in 0.8 ml. of methanol is mixed with 0.1 ml. of a molar aqueous solution of sodium thiosulfate and then with 0.1 ml. of glacial acetic acid. The solution is kept for 5 minutes at room temperature and a specimen thereof is then applied to a silica gel thin-layer plate and immediately chromatographed. Apart from $N^\epsilon$-tertiary butyloxycarbonyl-L-lysine no ninhydrin-positive substance can be identified.

The compounds listed in the following table are split in a similar manner. The Rƒ-values have been measured in system I.

TABLE

| Starting compound: | Rƒ |
|---|---|
| $N^\alpha$-NPS-$N^\epsilon$-BOC-L-lysine methyl ester | 0.70 |
| $N^\alpha$-NPS-$N^\epsilon$-BOC-L-lysyl-$N^\epsilon$-BOC-L-lysine methyl ester | 0.73 |
| Fission product: | |
| $N^\epsilon$-BOC-L-lysine methyl ester | 0.35 |
| $N^\epsilon$ - BOC - L - lysyl - $N^\epsilon$ - BOC - L - lysine methyl ester | 0.45 |

In no case is the BOC group affected.

Example 6.—$N^\epsilon$-tertiary butyloxycarbonyl-L-lysine-methyl ester acetate from $N^\alpha$-ortho-nitrophenylsulfenyl-$N^\epsilon$-tertiary butyloxycarbonyl-L-lysine-methyl ester by means of sulfurous acid 4.13 g. (10 mmol) of $N^\alpha$-ortho-nitrophenylsulfenyl-$N^\epsilon$-tertiary butyloxycarbonyl-L-lysine-methyl ester are dissolved in 100 ml. of methanol. The clear, orange-yellow solution is treated with 50 ml. of water, and the resulting yellow emulsion saturated with sulfur dioxide. After 25 minutes a clear, pale yellow solution is obtained which is kept in a closed flask at room temperature for two hours. The reaction mixture is then concentrated to a volume of about 5 ml. under reduced pressure, then dissolved in 50 ml. of methanol and treated with 0.98 g. (10 mmol) of potassium acetate and 2 ml. of glacial acetic acid. A crystalline precipitate of potassium-S-ortho-nitrophenylthiosulfate forms immediately. For completion of the crystallization the crystal suspension is kept in a refrigerator for an hour, then filtered and the filter residue washed with a little cold methanol. There are obtained 2.2 g. (81% of the theory) of potassium-S-orthonitrophenylthiosulfate. The filtrate and the washings are evaporated together under vacuum, the residue taken up with 50 ml. of ethyl acetate and evaporated again to eliminate the last traces of acetic acid. This operation is repeated three times. The residue is dissolved in 30 ml. of ethyl acetate, the solution cooled to 0° C. and kept at that temperature for some time. The potassium-S-ortho-nitrophenyl-thiosulfate that has crystallized in the meantime (0.3 g.=11% of the theory) is filtered off, and the clear, nearly colorless solution evaporated to dryness. Dissolution in ethyl acetate, cooling, filtration and evaporation yields more potassium-S-ortho-nitrophenylthiosulfate being eliminated. Last traces of potassium-S-ortho-nitrophenylthiosulfate are eliminated by recrystallization from a mixture of ethyl acetate and ether, the initially separating oily portions being removed by decantation. From the solution so purified, $N^\epsilon$-tertiary butyloxycarbonyl-L-lysine acetate crystallizes in nearly colorless needles. The latter are filtered off and washed with a small amount of a cold mixture of ethyl acetate and ether. 1.9 g. (60% of the theory) of $N^\epsilon$-tertiary butyloxycarbonyl-L-lysine-methyl ester acetate of melting point 72–74° C. are first obtained. From the mother liquor, another 0.9 g. (28% of the theory) of crystalline $N^\epsilon$-tertiary butyloxycarbonyl-L-lysine-methyl ester acetate of melting point 74–77° C. can be obtained.

Example 7.—Elimination of the ortho-nitrophenylsulfenyl protecting group with dilute sulfurous acid in the presence of the tertiary butyloxy-carbonyl protecting group and of the tertiary butylester protecting group 40 mg. of $N^\alpha$-ortho-nitrophenylsulfenyl-$N^\epsilon$-tertiary butyloxycarbonyl-L-lysine-methyl ester are treated with a saturated solution of sulfur dioxide in a mixture of equal parts by volume of methanol and water. At first, only part of the substance passes into solution, but after one hour all of it has dissolved to form a clear solution. At suitable intervals, test portions of 0.1 ml. each are taken from the reaction mixture, evaporated, dried in vacuum for a short while, and dissolved in 0.1 ml. of methanol. These test portions are analyzed by thin layer chromatography.

The NPS protecting group is found to be completely eliminated after 30 minutes.

In an analogous procedure, the NPS groups are split off the NPS peptide derivatives mentioned in the Table. The Rƒ-values are ascertained in the system I. In each case, the elimination of the NPS group is terminated after 30 minutes.

When 2 equivalents of hydrogen chloride are used in the place of sulfur dioxide, also the tertiary butyloxycarbonyl group is partially eliminated.

TABLE

| Starting compound: | Rƒ value |
|---|---|
| $N^\alpha$-ortho-nitrophenylsulfenyl-$N^\epsilon$-tertiary butyloxycarbonyl-L-lysyl-L-prolyl-L-valyl-glycine-ethyl ester (I) | 0.82 |
| $N^\alpha$-ortho-nitrophenylsulfenyl-$N^\epsilon$-tertiary butyloxycarbonyl - L - lysyl-L-valyl-L-tyrosyl-L-proline-tertiary butyl ester (II) | 0.87 |
| Cleavage product: | |
| $N^\epsilon$ - tertiary butyloxycarbonyl-L-lysyl-L-prolyl-L-valyl-glycine-ethyl ester | 0.36 |
| $N^\epsilon$ - tertiary butyloxycarbonyl-L-lysyl-L-valyl-L-tyrosyl-L-proline-tertiary butyl ester | 0.62 |

The starting materials can be prepared ae follows:

(a) Preparation of $N^\alpha$-ortho-nitrophenylsulfenyl-$N^\epsilon$-tertiary butyloxycarbonyl-L-lysyl-L-prolyl-L-valyl-glycine ethyl ester.—From 6.5 g. (11 mmol) of $N^\alpha$-ortho-nitrophenylsulfenyl-$N^\epsilon$-tertiary butyloxycarbonyl-L-lysine-dicyclohexyl ammonium salt, the free acid is prepared in ethyl acetate by means of dilute aqueous citric acid. The free acid is dissolved in 70 ml. of acetonitrile. To the clear, yellow solution are added 3 g. (10 mmol) of L-prolyl-L-valyl-glycine-ethyl ester. The mixture is cooled to −15° C., a crystalline substance separating. On addition of 20 ml. of dimethylformamide the greater part of the latter dissolves. At an internal temperature of −14 to −16° C., 2.5 g. (12 mmol) of dicyclohexylcarbodiimide are added in several portions in the course of 45 minutes, crystalline dicyclohexylurea separating. When the addition is complete, the batch is kept at −14 to −16° C. for another 30 minutes, and at +2° C. for 18 hours. It is then kept at room temperature for 48 hours, treated with 0.2 ml. of glacial acetic acid, and allowed to react for two hours. The dicyclohexylurea which has separated is filtered off.

The filtrate and the washings are evaporated together under reduced pressure, and 12 g. of a yellow oil obtained. This crude product is dissolved in 150 ml. of ethyl acetate. The resulting clear, yellow solution is washed with 2 N-citric acid, water, 2 N-sodium bicarbonate and 5% aqueous sodium sulfate solution, dried as usual, and evaporated. There remain behind 8.1 g. of a yellow oil which can be crystallized from ether. In this manner, 4.1 g. (61% of the theory) of $N^\alpha$-ortho-nitrophenylsulfenyl-$N^\epsilon$-tertiary butyloxycarbonyl - L - lysyl-L-propyl-L-valyl-glycine-ethyl ester of melting point 78–80° C. are obtained. Optical rotation, $[\alpha]_D^{20} = -109 \pm 0.5°$. Chromatography in three systems reveals the compound to by unitary.

(b) Preparation of $N^\alpha$-ortho-nitrophenylsulfenyl-$N^\epsilon$-tertiary butyloxycarbonyl - L - lysyl-L-valyl-L-tyrosyl-L-prolyl-tertiary butyl esters.—From 6.5 g. (11 mmol) of $N^\alpha$-ortho-nitrophenylsulfenyl-$N^\epsilon$-tertiary butyloxycarbonyl-L-lysine-dicyclohexylammonium salt the free acid is prepared in ethyl acetate by means of an aqueous solution of citric acid. The free acid is dissolved in 50 ml. of acetonitrile. To the resulting clear, yellow solution are added 4.4 g. (10 mmol) of L-valyl-L-tyrosyl-L-proline-tertiary butyl ester which also dissolves to give a clear solution. With slight cooling, 2.3 g. (11 mmol) of solid dicyclohexylcarbodiimide are then added in several portions in the course of 30 minutes. During this time, dicyclohexylurea begins to crystallize out. The batch is stirred at room temperature for another 10 hours, 0.2 ml. of glacial acetic acid are then added and allowed to react for 45 minutes before the mixture is cooled to +3° C. The batch is then filtered, the filter residue washed with acetonitrile and ether, and the filtrate and the washings evaporated to dryness together under reduced pressure. The foamy, amorphous residue is further dried under vacuum for 2 hours at 60° C. In this manner, 9.2 g. (100% of the theory) of crude $N^\alpha$-ortho-nitrophenylfenyl-$N^\epsilon$-tertiary butyloxycarbonyl - L-lysyl-L-valyl-L-tyrosyl-L-proline-tertiary butyl ester (II) are obtained.

4.0 g. of this product are dissolved in 50 ml. of ethyl acetate and the solution washed at 0° C. with 2 N-citric acid solution and 2 N-potassium carbonate solution, then dried in the usual manner and evaporated. 4.0 g. of purified II are obtained in the form of a yellow, foamy, amorphous solid substance which becomes plastic between 95 and 115° C. According to the chromatogram (2 systems), only traces of impurities are present, and microanalysis gives the expected values. Optical rotation, $[\alpha]_D^{20} = -56 \pm 0.5°$ (c. =2 in methanol).

Example 8.—$N^\epsilon$-tertiary butyloxycarbonyl-L-lysine-methyl ester acetate from $N^\alpha$-ortho-nitrophenylsulfenyl-$N^\epsilon$-tertiary butyloxycarbonyl-L-lysine-methyl ester by means of weak, inorganic acids 20 mg. (about 0.05 mmol) of $N^\alpha$-ortho-nitrophenylsulfenyl-$N^\epsilon$-tertiary butyloxycarbonyl-L-lysine-methyl ester (I) are dissolved in a mixture of 0.9 ml. of methanol and 0.1 ml. of glacial acetic acid. To the clear, yellow solution are added 13 mg. (about 0.20 mmol) of sodium azide, and the mixture kept at room temperature in a closed flask. Test portions are taken from the reaction mixture at intervals, placed on thin-layer plates and chromatographed immediately. After about 20 minutes crystals of di-(ortho-nitrophenyl)-disulfide begin to separate. At the same time the solution assumes a paler color. After 8 hours it is but faintly yellow. According to the chromatograms, the elimination of the NPS group is complete after 8 hours.

Analogous experiments are made with ammonium thiocyanate (16.2 mg. =0.21 mmol) and sodium bisulfide (20 mg. =0.36 mmol) in the place of sodium azide. In the case of the former, the NPS group is split off after 8 hours, in the case of the latter after 30–60 minutes.

Example 9.—$N^\epsilon$-tertiary butyloxycarbonyl-L-lysine-methyl ester acetate from $N^\alpha$-ortho-nitrophenylsulfenyl-$N^\epsilon$-tertiary butyloxycarbonyl-L-lysine-methyl ester by means of thiophenol 2.07 g. (5 mmol) $N^\alpha$-ortho-nitrophenylsulfenyl-$N^\epsilon$-tertiary butyloxycarbonyl-L-lysine-methyl ester are dissolved in 50 ml. of methanol. To the resulting solution are added 5.0 mg. (4.7 g., 42 mmol) of thiophenol and 5.0 ml. of glacial acetic acid, and the resulting clear, yellow solution allowed to stand for 4 hours in a closed vessel. The solution is then evaporated under reduced pressure. To the yellow, oily residue are added 30 ml. of methanol which are then expelled in vacuum to remove any thiophenyl and acetic acid that may still be present. This operation is repeated once. Finally, the batch is heated at 40° C. for 1 hour under a high vacuum, and the oily residue (3.2 g.) dissolved in 50 ml. of ethyl acetate, and the solution extracted with 2 N-acetic acid. The yellow etheral layer is discarded, the faintly yellowish aqueous layer evaporated to dryness under reduced pressure, and the residue freed from volatile constituents for 1 hour at 40° C. under a high vacuum. There remain behind 1.94 g. of a largely crystalline, pale brownish mass. Recrystallization from ether yields 0.95 g. (59% of the theory) of pale yellowish $N^\epsilon$-tertiary butyloxycarbonyl-L-lysine-methyl ester acetate (I). Melting point, 77–78° C. From the mother liquor another 0.15 g. (9.4% of the theory) of faintly brownish crystals are obtained.

Example 10.—$N^\epsilon$-tertiary butyoloxycarbonyl - L - lysine-methyl ester acetate from $N^\alpha$-ortho-nitrophenylsulfenyl-$N^\epsilon$-tertiary butyloxycarbonyl-L-lysine-methyl ester by means of thiols or thiourea 20 mg. (about 0.05 mmol) of $N^\alpha$-ortho-nitro-phenylsulfenyl-$N^\epsilon$-tertiary butyloxycarbonyl-L-lysine-methyl ester are dissolved in 1 ml. of a mixture of 3 parts by volume of methanol and 1 part by volume of glacial acetic acid. To the clear, yellow solution 0.05 ml. (about 0.5 mmol) of 75% aqueous thioglycollic acid solution are added, and the mixture kept at room temperature in a closed vessel. Test portions are taken from the reaction solution at intervals, placed on thin-layer plates, and chromatographed immediately. It is observed that the NPS protecting group is completely eliminated after 8 hours.

Analogous experiments are made with dithioglycol (0.05 ml.=0.5 mmol) and thiourea (50 mg.=1.66 mmol) in the place of thioglycollic acid. In the case of the former the elimination of the NPS group is complete after 24 hours, in the case of the latter after 3 minutes.

Example 11.—$N^\epsilon$-tertiary butyloxycarbonyl - L - lysine-methyl ester acetate from $N^\alpha$-ortho-nitrophenylsulfenyl-$N^\epsilon$-tertiary butyloxycarbonyl-L-lysine-methyl ester by means of thioacetamide 2.06 g. (5 mmol) $N^\alpha$-ortho-nitrophenylsulfenyl-$N^\epsilon$-tertiary butyloxycarbonyl-L-lysine-methyl ester and 0.40 g. (5.3 mmol) of thioacetamide are dissolved in 20 ml. of methanol. To the clear, yellow solution are added 5.0 ml. of glacial acetic acid. After about one minute, a crystalline substance begins to separate. For completion of the crystallization, the reaction mixture is kept in a refrigerator for 1 hour. (Chromatographic investigation shows that the NPS protecting group is completely eliminated after as little as three minutes.) The batch is filtered, the yellow, crystalline residue (melting point 154–172° C.) washed with cold methanol, and the filtrate evaporated under reduced pressure together with the washings. The pale brown residue (2.4 g.) is dissolved in 50 ml. of ethyl acetate, and the solution extracted with 50 ml. of water and 2×10 ml. of 2-N-acetic acid. The extracts are evaporated simultaneously under reduced pressure and dried at room temperature under a high vacuum. There remain behind 1.4 g. of an oily residue which are crystallized from a mixture of ethyl acetate and ether. There are obtained in this manner 0.65 g. (40.5% of the theory) of a slightly yellowish $N^\epsilon$-tertiary butyloxycarbonyl-L-lysine-methyl ester acetate of melting point 76–78° C. From the mother liquor a second crystal fraction can be obtained which melts at 76–78° C. (0.15 g.=9.5% of the theory).

Example 12.—Elimination of the ortho-nitrophenylsulfenyl-protecting group from $N^\alpha$-ortho-nitrophenylsulfenyl-$N^\epsilon$-tertiary butyloxycarbonyl-L-lysine-methyl ester by means of potassium iodide in the presence of dilute acetic acid 20 mg. (about 0.05 mmol) of $N^\alpha$-ortho-nitrophenylsulfenyl-$N^\epsilon$-tertiary butyloxycarbonyl-L-lysine-methyl ester are dissolved in a mixture of 0.9 ml. of methanol and 0.1 ml. of glacial acetic acid. To the resulting clear, yellow solution are added 30.5 mg. (0.18 mmol) of potassium iodide. Separating iodine immediately imparts a brown color to the solution. At the same time, a crystalline, yellow precipitate of di-(ortho-nitrophenyl)-disulfide forms. A test portion taken from the reaction mixture 3 minutes later is placed on a thin-layer plate and chromatographed immediately. It is observed that the NPS protecting group has already been eliminated completely.

Example 13.—$N^\epsilon$-tertiary butyloxycarbonyl - L - lysine-methyl ester acetate from $N^\alpha$-pentachlorophenylsulfenyl-$N^\epsilon$-tertiary butyloxycarbonyl-L-lysine-methyl ester by means of hydrocyanic acid 1.04 g. (1.9 mmol) of $N^\alpha$-pentachlorophenylsulfenyl-$N^\epsilon$-tertiary butyloxycarbonyl-L-lysine-methyl ester are suspended in 33 ml. of a 2 N-solution of hydrocyanic acid in methanol. 10 ml. of glacial acetic acid are added and the whole kept at room temperature for 18 hours in a closed vessel. The resulting colorless suspension is then evaporated to dryness in vacuum, the residue dissolved in 50 ml. of ether, and the insoluble, crystalline pentachlorophenylthiocyanate (0.28 g., M.P. 175–180° C.) filtered off. The clear, colorless solution is extracted with 3 × 50 ml. of 2 N-acetic acid, dried with anhydrous sodium sulfate, and evaporated to dryness under reduced pressure. Another 0.36 g. of pentachlorophenylthiocyanate are thus obtained. The acetic acid extracts are combined and evaporated to dryness under reduced pressure, the residue triturated several times with a small amount of benzene for removal of any residual acetic acid and water, and evaporated to dryness each time. In this manner, 0.55 g. (90% of the theory) of $N^\epsilon$-tertiary butyloxycarbonyl-L-lysine-methyl ester acetate of melting point 70–75° C. is obtained. The thin-layer chromatogram reveals but traces of impurities. Lysine-methyl ester of lysine cannot be detected.

The pentachlorophenylthiocyanate obtained as by-product is purified by high vacuum sublimation. The slightly yellowish sublimate is pure according to analysis and melts at 178–180° C.

The starting material can be prepared as follows:

3.2 g. (10 mmol) of $N^\epsilon$-tertiary butyloxycarbonyl-L-lysine methyl ester acetate are dissolved in 25 ml. of chloroform. To the resulting clear solution are added 2.8 ml. (2.0 g., 20 mmol) of triethylamine. While stirring vigorously, 3.2 g. (10 mmol) of pentachlorophenylsulfenyl chloride are then added in several portions. A suspension forms which is stirred at room temperature for 19 hours. The greater part of the undissolved matter has then passed into solution. A small remainder (0.2 g.) of solid constituents is then eliminated by filtration, the colorless filtrate washed with water, 2 N-citric acid solution, 2 N-sodium bicarbonate solution, and water, then dried with magnesium sulfate, and evaporated to dryness. There remain 5.8 g. of an oily residue, which are crystallized from a mixture of ether and petroleum ether. 3.2 g. (59.4% of the theory) of $N^\alpha$-pentachlorophenylsulfenyl-$N^\epsilon$-tertiary butyloxycarbonyl-L-lysine-methyl ester of melting point 80–81° C. are obtained. For analysis, a test portion of the substance is recrystallized twice from a mixture of ether and petroleum ether after which it melts at 81–81.5° C. Optical rotation $[\alpha]_D^{20}=+26\pm0.5°$ (c.=2 in methanol).

Example 14.—Elimination of various arylsulfenyl protecting groups by means of sulfurous acid 40 mg. (about 0.1 mmol) of $N^\alpha$-pentachlorophenylsulfenyl-$N^\epsilon$-tertiary butyloxycarbonyl - L - lysine - methyl ester are suspended in 2 ml. of a saturated solution of sulfur dioxide in a mixture of equal parts of methanol and water. Part of the substance passes into solution. Test portions of 0.1 ml. are taken from the reaction mixture at intervals and are evaporated, dried under reduced pressure for a short while, and dissolved in 0.1 ml. of methanol. These test portions are examined by thin-layer chromatography. It is observed that the pentachlorophenylsulfenyl group is eliminated completely after 30 minutes already. The R$f$ value of the starting material in the system I is 0.85, that of the resulting $N^\epsilon$-tertiary butyloxycarbonyl-L-lysine-methyl ester 0.35.

In an analogous procedure, the 2,4-dinitrophenylsulfenyl protecting group is split off the $N^\alpha$-2,4-dinitrophenylsulfenyl-$N^\epsilon$-tertiary butyloxycarbonyl - L - lysine - methyl ester. Here, the cleavage is complete after 24 hours only. The R$f$ value of the starting material in the system I is 0.92, that of the cleavage product 0.35, as above.

The starting product $N^\alpha$-2,4-dinitrophenylsulfenyl-$N^\epsilon$-tertiary butyloxycarbonyl-L-lysine-methyl ester can be prepared as follows:

3.2 g. (10 mmol) of $N^\epsilon$-tertiary butyloxycarbonyl-L-lysine-methyl ester acetate are dissolved in 25 ml. of chloroform. To the resulting clear solution are added 2.8 ml. (2.0 g., 20 mmol) of triethylamine. While stirring vigorously, 2.4 g. (10 mmol) of 2,4-dinitrophenylsulfenyl chloride are added in several portions in the course of 20 minutes. The yellow suspension is stirred at room temperature for 18 hours. After that time, only a small quantity of undissolved matter is present and is filtered off (0.05 g.). The clear, yellow filtrate is washed with water, 2 N-citric acid solution, 2 N-sodium bicarbonate solution, and water, dried with solid sodium sulfate, and evaporated. 5.1 g. of a yellow oil are obtained and dissolved in ether. A little undissolved by-product is filtered off, and the solution then treated with petroleum ether until crystallization sets in. The solution is kept at room temperature for about 4 hours during which time large quantities of yellow crystals separate. To complete crystallization, the batch is kept at 0° C. for 20 hours, after which the crystals are filtered off and washed with petroleum ether. In this manner, 3.2 g. (62% of the theory) of $N^\alpha$-2,4-dinitrophenylsulfenyl - $N^\epsilon$ - tertiary butyloxycarbonyl - L - lysine-methyl ester of melting point 77–82° C. are obtained. After another crystallization, an analytically pure preparation of melting point 84–84.5° C. is obtained.

Example 15.—$N^\epsilon$ - tertiary butyloxycarbonyl - L - lysine-methyl ester-formate or propionate from $N^\alpha$-ortho-nitrophenylsulfenyl - $N^\epsilon$ - tertiary butyloxycarbonyl-L-lysine-methyl ester by means of hydrocyanic acid 1.24 g. (3 mmol) of $N^\alpha$-ortho-nitrophenylsulfenyl-$N^\epsilon$-tertiary butyloxycarbonyl-L-lysine-methyl ester (I) are dissolved in 60 ml. of a 2 N-solution of hydrogen cyanide in methanol. To the resulting clear yellow solution 15 ml. of 85% aqueous formic acid are added and the mixture is kept at room temperature for 20 hours in a closed vessel. The batch is then evaporated to dryness under reduced pressure, the residue dissolved in 40 ml. of benzene for removal of any remaining formic acid, and the solution evaporated to dryness. This operation is repeated twice. The yellow residue is dissolved in 50 ml. of ether and the solution extracted with 3×25 ml. of 2 N-aqueous formic acid and with 3×25 ml. of water. From the ethereal layer, 0.56 g. (100% of the theory) of orthonitrophenylthiocyanate of melting point 121–123° C. can be obtained. The aqueous extracts are combined, evaporated under vacuum, freed with benzene in the usual manner from residual water and acetic acid, and dried for 1 hour at 40° C. under a high vacuum. There remain behind 1.25 g. of a slightly brownish oil: $N^\epsilon$-tertiary butyloxycarbonyl-L-lysine-methyl-ester formate.

By an analogous procedure there are obtained from 1.24 g. of I, 60 ml. of 2 N-hydrogen cyanide in methanol and 15 ml. of propionic acid, 1.08 g. of $N^\epsilon$-tertiary butyloxycarbonyl-L-lysine-methyl ester propionate in the form of a partly crystalline, pale brown substance.

Both preparation are chromatographically unitary.

Example 16.—$N^\epsilon$-tertiary butyloxycarbonyl - L - lysine methyl ester acetate from $N^\alpha$-pentachlorophenylsulfenyl $N^\epsilon$ tertiary butyloxycarbonyl - L - lysine methyl ester by means of sulfurous acid (a) 5.40 g. (10 mmol) of $N^\alpha$-pentachlorophenylsulfenyl - $N^\epsilon$ - tertiary butyloxycarbonyl-L-lysine methyl ester are dissolved in 200 ml. of methanol. 100 ml. of water are added to the clear, colorless solution, a colorless emulsion being formed which is saturated with sulfur dioxide. After 50 minutes the solution is still only faintly turbid. It is kept for 1½ hours in a sealed flask at room temperature. The reaction mixture is then evaporated to dryness in vacuo. 7.8 g. of a crystalline residue are obtained which is recrystallized from a mixture of 400 ml. of ethyl acetate and 50 ml. of methanol, to yield 4.5 g. (72% of the theory) of colorless, crystalline S-pentachlorophenylthiosulfuric acid salt of $N^\epsilon$-tertiary butyloxycarbonyl - L - lysine methyl ester melting at 142–144° C. (with decomposition). A test portion of this substance is recrystallized from ethyl acetate and melts then at 145–146° C.

(b) 2.50 g. (4 mmol) of the salt obtained under (a) are dissolved in 30 ml. of methanol. A solution of 0.416 g. (4.3 mmol) of anhydrous potassium acetate in 10 ml. of methanol are added to the above solution, a crystalline, colorless precipitate of potassium - S - pentachlorophenylthiosulfate being formed. The reaction mixture is kept for one hour in a refrigerator at +3° C., then filtered and the filter residue washed with cold methanol, to yield 1.38 g. (84% of the theory) of potassium-S-pentachlorophenylthiosulfate melting at 230° C. (with decomposition). The filtrate is evaporated together with the washing liquid in vacuo, dissolved in 30 ml. of ethyl acetate with heating, and cooled to 0° C., further potassium-S-pentachlorophenylthiosulfate (50 mg., 3% of the theory) separating, which is removed by filtration. The filtrate is concentrated and treated with petroleum ether. After seeding, 1.08 g. (84% of the theory) of $N^\epsilon$-tertiary butyloxycarbonyl-L-lysine methyl ester acetate crystallizes which melts at 73–75° C. after being recrystallized once more.

Example 17.—$N^\epsilon$-tertiary butyloxycarbonyl - L - lysine methyl ester from $N^\alpha$-ortho - nitrophenylsulfenyl - $N^\epsilon$-tertiary butyloxycarbonyl - L - lysine methyl ester by means of substituted thiophenols, phenylthiourea, thiobenzamide and xanthogen amide 40 mg. (about 0.1 mmol) of $N^\alpha$-ortho-nitrophenylsulfenyl - $N^\epsilon$ - tertiary butyloxycarbonyl - L - lysine methyl ester are dissolved in 1.5 ml. of methanol. 0.5 ml. of glacial acetic and 40 mg. (about 0.3 mmol) of meta-thiocresol are added and the mixture kept in a sealed vessel at room temperature. From the reaction mixture test portions are taken at intervals which are put on to thin-layer plates and chromatographed immediately. it is found that the NPS protective group is eliminated completely after about 24 hours. Analogous experiments are carried out with toluene-3,4-dithiol (40 mg.=about 0.26 mmol), N-phenylthiourea (40 mg.=about 0.26 mmol), thiobenzamide (40 mg.=about 0.3 mmol) and xanthogen amide (40 mg.=about 0.4 mmol) instead of meta-thiocresol. In these cases the NPS group is completely eliminated at the latest after 15 minutes.

Example 18.—N-tertiary butyloxycarbonyl - L - lysyl-L-valyl - L - tyrosyl - L - proline tertiary butylester from $N^\alpha$-ortho - nitrophenylsulfenyl $N^\epsilon$-tertiary butyloxycarbonyl L-lysyl - L - valyl-L-tyrosyl-L-proline tertiary butylester by means of thioacetamide 2.40 g. (3 mmol) of $N^\alpha$-ortho-nitrophenylsulfenyl-$N^\epsilon$-tertiary butyloxycarbonyl - L - lysyl-L-valyl-L-tyrosyl-L-proline tertiary butylester are dissolved in 20 ml. of methanol. 0.46 g. (6 mmol) of thioacetamide and 5 ml. of glacial acetic acid are added to the yellow solution. The solution at once assumes a distinctly paler color and after about 2 minutes precipitation of a yellow, crystalline solid (di-ortho-nitrophenyltrisulfide and di-ortho-nitrophenyldisulfide) begins. The mixture is filtered after 15 minutes, the residue washed on the filter with 20 ml. of methanol and the clear, pale yellow filtrate concentrated in vacuo after the addition of 20 ml. of water. 10 ml. of ethyl acetate are added to the residue and the whole once more evaporated. The residue is taken up in another 10 ml. of ethyl acetate and filtered. The filtrate is extracted once with 20 ml. of water and twice with 20 ml. of 2 N acetic acid each time. The aqueous extracts are combined, concentrated to a volume of 10 ml. and treated with 20 ml. of a saturated solution of sodium bicarbonate in water, a colorless, resinous solid precipitating which is separated from the solution by decanting, washed with a little cold water and dissolved in methylene chloride. This solution is dried with sodium sulfate and evaporated to yield $N^\epsilon$-tertiary butyloxycarbonyl-L-lysyl-L-valyl-L-proline tertiary butyl ester in the form of a white foam. The substance is identical with material which is prepared according to R. Schwyzer et al., Helv. Chem. Acta 46, 1541 (1963).

Example 19.—S-trityl - L - cysteine from N-ortho-nitrophenylsulfenyl - S - trityl-L-cysteine by means of various organic eliminating agents 40 mg. (about 0.08 mmol) of N-ortho-nitrophenylsulfenyl-S-trityl-L-cysteine are dissolved in a mixture of 1.5 ml. of methanol and 0.5 ml. of glacial acetic acid. 40 mg. (about 0.5 mmol) of thiourea are added to the solution and the reaction mixture is kept in a sealed vessel at room temperature. From the reaction solution test portions are taken at intervals which are put on to thin-layer plates and then chromatographed immediately. It is found that the NPS protective group is completely eliminated after 5 minutes.

Analogous experiments are carried out with thiobenzamide (40 mg.=about 0.3 mmol), xanthogen amide (40 mg.=about 0.4 mmol) and thiophenol (0.05 ml.=about 0.5 mmol) instead of thiourea. In the first case the elimination of the NPS protective group is completed after 60 minutes, in the second case it lasts 15 minutes and in the third case about 24 hours. In no case is cysteine or cystine present.

Example 20.—S-trityl-L-cysteine from N-orthonitrophenylsulfenyl-S-trityl-L-cysteine by means of hydrocyanic acid 40 mg. (=about 0.08 mmol) of N-ortho-nitrophenylsulfenyl-S-trityl-L-cysteine are dissolved in 2 ml. of a 2 N solution of hydrocyanic acid in methanol. After the addition of 0.5 ml. of glacial acetic the mixture is kept in a sealed vessel at room temperature. Test portions are taken at intervals which are evaporated in vacuo and analyzed by means of thin-layer chromatography. The elimination of the NPS protective group is completed after 24 hours. There is no cysteine or cystine present.

Example 21.—$N^\alpha$ - benzyloxycarbonyl-L-phenylalanyl-$N^\epsilon$-tertiary butyloxycarbonyl - L - lysyl - glycine hydrazide. Synthesis on solid substrata (a) 40.0 g. of chlormethylated copolymers from styrene and divinylbenzene (2% divinylbenzene), 200–400 mesh, beads, chlorine content=8.28% (2.34 m. equivalents/g. resin) are boiled under reflux in a solution of 15.75 ml. (0.112 mmol) of triethylamine and 19.6 g. (0.112 mmol) of tertiary butyloxycarbonyl-glycine in 400 ml. of dry ethyl acetate for seven hours with stirring. The reaction mixture is then filtered and the resin washed with ethyl acetate and alcohol in several portions. For this purpose the resin, which has been suctioned dry on the filter, is suspended in 2 to 3 times its quantity of solvent, allowed to stand for about 5–10 minutes and then filtered. On changing the washing solvent, washing is carried out once each with a 4:1 and 1:1 mixture of the two solvents. The resin washed in this manner is boiled under reflux in a solution of 60 g. of anhydrous sodium acetate and 1.3 g. of potassium iodide in 1000 ml. of alcohol with stirring for 4 hours. After cooling to room temperature, the reaction mixture is filtered, the resin washed in turn with alcohol, water and methanol as indicated above and dried for 20 hours at 80° C. under 14 mm. of mercury, to yield 41.7 g. (99% of the theoretical quantity) of tertiary butyloxycarbonyl-glycine polymer. Content of glycine: 0.25± 0.02 m. equivalents/g. resin.

(b) 10.0 g. (corresponding to 2.5 m. equivalents of tertiary butyloxycarbonyl-glycine) of the resin prepared as described in (a) are suspended in 30 ml. of a 1 N HCl in glacial acetic and stirred for ½ hour at room temperature. The reaction mixture is then filtered and the resin washed, as indicated, with glacial acetic acid, alcohol and dimethylformamide. The resin is then suspended in a mixture of 40 ml. of freshly distilled dimethylformamide and 5 ml. of triethylamine, stirred for 10 minutes, and then filtered, and the residue washed four times with 40–50 ml. of fresh dimethylformamide each time.

(c) From 4.64 g. (8 mmol) of dicyclohexylammonium salt of $N^\alpha$-ortho-nitrophenylsulfenyl-$N^\epsilon$-tertiary butyloxycarbonyl-L-lysine the free acid is prepared by means of dilute aqueous citric acid solution, which is dissolved in 50 ml. of freshly distilled dimethylformamide. The resin obtained as described in (b) is added and the suspension is stirred for 10 minutes at room temperature. A solution of 1.65 g. (8 mmol) of dicyclohexylcarbodiimide in 15 ml. of dimethylformamide is then added and the mixture stirred for 2 hours at room temperature. After this, the reaction mixture is filtered, the resin washed, as indicated, with dimethylformamide and methanol and dried for 16 hours at 40–50° C. under 0.01 mm. pressure of mercury. 10.6 g. of $N^\alpha$-ortho-nitrophenylsulfenyl-$N^\epsilon$-tertiary butyloxycarbonyl-L-lysyl-glycine polymer are obtained in the form of a yellow powder.

(d) The whole quantity of the resin obtained as described in (c) is suspended in 40 ml. of methanol and after the addition of 8.8 ml. of glacial acetic acid stirred for 15 minutes at room temperature. 3.55 g. (47 mmol) of thioacetamide are then added and the whole stirred for another 30 minutes at room temperature. The reaction mixture is filtered and the resin washed, as indicated, with methanol, glacial acetic acid and dimethylformamide. The still moist resin is stirred into a mixture of 72 ml. of dimethylformamide and 7 ml. of triethylamine for 10 minutes at room temperature. After filtering, this operation is repeated, whereupon the resin is washed as usual with dimethylformamide. $N^\epsilon$-tertiary butyloxycarbonyl-L-lysyl-glycine polymer is obtained.

(e) The still moist resin is suspended in 70 ml. of dimethylformamide and 2.82 g. (9.4 mmol) of benzyloxycarbonyl-L-phenylalanine are added. The suspension is stirred for 10 minutes at room temperature, 1.99 g. (9.7 mmol) of dicyclohexylcarbodiimide are added, whereupon stirring is continued for another 2 hours at room temperature. After filtration the residue is washed, as indicated, with dimethylformamide, glacial acetic acid and methanol. The resin is dried for 16 hours at 40–50° C. under 14 mm. pressure of mercury to yield 10.4 g. of a faintly brownish powder which is $N^\alpha$-benzyloxycarbonyl-L-phenylalanyl-$N^\epsilon$-tertiary butyloxycarbonyl-L-lysyl-glycine polymer.

(f) 10.0 g. of the resin prepared as described in (e) are suspended in 100 ml. of absolute ethyl alcohol and after the addition of 25 ml. of hydrazine hydrate stirred for 6 hours at room temperature. The reaction mixture is then filtered and the residue washed several times with 50 ml. of ethyl alcohol each time. The combined filtrates and washings are evaporated in vacuo at 40° C. under 14 mm. pressure of mercury and dried at room temperature under 14 mm. pressure of mercury over concentrated sulfuric acid for 20 hours and freed from hydrazine hydrate. 2.0 g. of a crystalline crude product are obtained which in addition to the main product, $N^\alpha$-benzyloxycarbonyl - L - phenylalanyl - $N^\epsilon$-tertiary butyloxycarbonyl-L-lysyl-glycine azide and small quantities of non-identifiable side-products contains acetic acid anhydride and hydrazine hydrochloride. After being recrystallized several times from alcohol+water a chromatographically unitary product, melting at 160° C., is obtained which is identical with $N^\alpha$ - benzyloxycarbonyl-L-phenylalanyl-$N^\epsilon$-tertiary butyloxycarbonyl-L-lysyl-glycine hydrazide prepared according to other methods. The product may be prepared, for example, by known methods as follows: 5.05 g. of glycine methyl ester hydrochloride are suspended in a mixture of 150 ml. of acetonitrile and 17 ml. of dimethylformamide. After the addition of 6.0 ml. of triethylamine the mixture is cooled to −5° C. 20.5 g. of $N^\alpha$-benzyloxycarbonyl-$N^\epsilon$-tertiary butyloxycarbonyl-L-lysine, dissolved in 50 ml. of acetonitrile, are then added, and with stirring and cooling a solution of 9.0 g. of dicyclohexylcarbodiimide in 60 ml. of acetonitrile are added dropwise in the course of 30 minutes. Stirring is continued for another 20 hours at −5° C. to 1° C., and 1 ml. of glacial acetic acid is then added. The reaction mixture is freed from a small quantity of undissolved material by filtration and then evaporated in vacuo. The residue is taken up with 200 ml. of ethyl acetate. The insoluble sideproduct, dicyclohexylurea, is filtered off, washed with a little ethyl acetate and the filtrate washed as usual with sodium bicarbonate, citric acid solution and sodium chloride solution. The ethyl acetate solution is then dried over magnesium sulfate and evaporated in vacuo, to leave 20 g. of a pale yellow oil from which, by crystallization from a mixture of ether and petroleum ether, 9.6 g. (64% of the theory) of crystalline $N^\alpha$-benzyloxycarbonyl-$N^\epsilon$-tertiary butyloxycarbonyl-L-lysyl-glycine methyl ester melting at 86–87° C. are obtained.

9.05 g. of this product are dissolved in 80 ml. of methanol and, after the addition of 1.89 g. of monochloracetic acid and 2 g. of palladium on active charcoal carbon (10% strength), hydrogenoted as usual. After filtration and evaporation, 8.5 g. of $N^\epsilon$-tertiary butyloxycarbonyl-L-lysyl-glycine methyl ester monochloracetate are obtained in the form of a clear, colorless resin which is processed without any further purification.

The crude $N^\epsilon$-tertiary butyloxycarbonyl-L-lysyl-glycine methyl ester monochloracetate is dissolved in 120 ml. of water and the solution extracted at 0° C. twice with 50 ml. of ether each time. The aqueous layer is then covered with 240 ml. of ethyl acetate and treated with 270 g. of potassium carbonate with ice-cooling. After agitating for a short time, the ethyl acetate layer is separated, the aqueous layer extracted twice with 100 ml. of ethyl acetate each time, the combined ethyl acetate extracts washed with saturated sodium chloride solution, dried over calcined sodium sulfate and evaporated.

6.1 g. of benzyloxycarbonyl-L-phenylalanine are dissolved in 250 ml. of absolute ethyl acetate and the solution cooled to −10° C. 3.18 ml. of dry triethylamine are added with the exclusion of moisture, and a solution of 3.00 ml. of isobutylchloroformate in 40 ml. of ethyl acetate is added dropwise in the course of 15 minutes with further cooling and stirring. Stirring is continued for another 15 minutes at −10° C., whereupon the above obtained quantity of $N^\epsilon$-tertiary butyloxycarbonyl-L-lysyl-glycine methyl ester, dissolved in 100 ml. of absolute ethyl acetate, is added dropwise in the course of 20 minutes. The white suspension is left for 4 hours at −8 to −10° C. and for 18 hours at room temperature with stirring, is then evaporated in vacuo and the solid residue dissolved in 250 ml. of chloroform. This solution is washed as usual at 0 to +5° C. with citric acid solution, aqueous potassium carbonate solution and saturated sodium chloride solution, dried over solid potassium carbonate and evaporated. The semisolid residue is crystallized from ethyl acetate, 7.2 g. (60.3% of the theory) of $N^\alpha$-benzyloxycarbonyl - L - phenylalanyl-$N^\epsilon$-tertiary butyloxycarbonyl-L-lysyl-glycine methyl ester melting at 157–158° C. being obtained. From the mother liquor another 4.2% of the theory of this product can be obtained.

1.8 g. of $N^\alpha$-benzyloxycarbonyl-L-phenylalanyl-$N^\epsilon$-tertiary butyloxycarbonyl-L-lysyl-glycine methyl ester are dissolved in 60 ml. of absolute ethyl alcohol, treated with 6.0 ml. of hydrazine hydrate and left for 24 hours at room temperature. The clear, colorless solution is then evaporated and dried under 14 mm. pressure of mercury over concentrated sulfuric acid at room temperature for 6 hours. After recrystallization from ethyl alcohol, 1.65 g. of pure $N^\alpha$-benzyloxycarbonyl-L-phenylalanyl-$N^\epsilon$-tertiary butyloxycarbonyl - L - lysyl - glycine hydrazide melting at 162–163° C. are obtained.

What is claimed is:

1. Process for the selective elimination of the sulfenyl group from N-sulfenyl-α-aminocarboxylic acid derivatives, wherein an $N^\alpha$-sulenyl-α-amino acid derivative in which the sulfenyl group is a member selected from the group consisting of ortho-nitrophenylsulfenyl, ortho,paradinitrophenylsulfenyl and pentachlorophenylsulfenyl, containing at least one other acid-labile protecting group is reacted in a weakly acid reaction medium at pH of 3–6.5 with a member selected from the group consisting of an organic compound of the formula

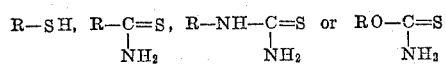

in which R is a member selected from the group consisting of hydrogen, lower alkyl, monocyclic aromatic hydrocarbon and each of said groups substituted by at least one member selected from the group consisting of mercapto, hydroxy, carboxy and lower alkoxy, and an inorganic compound selected from the group consisting of thiosulfuric acid, sulfurous acid, hydrogen sulfide, thiocyanic acid, hydrocyanic acid, hydrazoic acid and an alkali metal salt of hydroiodic acid.

2. Process according to claim 1, wherein the weak, inorganic acid used is thiosulfuric acid.

3. Process according to claim 1, wherein the weak, inorganic acid used is sulfurous acid.

4. Process according to claim 1, wherein the reaction is performed with a compound selected from the group consisting of a monomercapto-arene and a dimercapto-arene, in which arene is a member selected from the group consisting of benzene and naphthalene, and said benzene and naphthalene substituted by a member selected from the group consisting of lower alkyl, lower alkoxy and halogen.

5. Process according to claim 1, wherein the reaction is performed with thioacetamide.

6. Process according to claim 1, wherein the reaction is performed with an N-unsubstituted amide of a thiocarboxylic acid.

7. Process according to claim 1, wherein the reaction is performed with a thiocarbonic acid amide.

8. Process according to claim 1, wherein the reaction is performed with a compound selected from the group consisting of unsubstituted thiourea and thiourea substituted by at least one hydrocarbon radical.

9. Process according to claim 7, wherein the reaction is performed with a thiocarbamic acid ester.

10. Process according to claim 1, wherein the reaction is performed with thioglycollic acid.

11. Process according to claim 1, wherein the sulfenyl group used is the o-nitrophenyl-sulfenyl group.

12. Process according to claim 1, wherein the reaction is performed at a pH of from 3 to 6.5.

13. Process according to claim 1, wherein the reaction is performed in the presence of a lower alkanoic acid.

14. Process according to claim 1, wherein the reaction is performed in the presence of acetic acid.

15. Process according to claim 1, wherein the reaction is performed at room temperature.

16. Process according to claim 1, wherein the $N^\alpha$-sulfenyl protecting group is eliminated from a peptide which has an amino group protected by a tertiary butyloxycarbonyl group in the side chain.

17. Process according to claim 1, wherein the $N^\alpha$-sulfenyl protecting group is eliminated from a peptide which contains a tertiary butyl ester group.

18. Process according to claim 1, wherein the $N^\alpha$-sulfenyl protecting group is selectively split off a peptide having a trityl protecting group in the side chain.

19. In a process according to claim 1, wherein a peptide having at least one functional group selected from the group consisting of an amino, a carboxyl, a hydroxy and a mercapto group in the side chain is synthesized by solid phase synthesis by fusing on to an amino acid or peptide bound to a resin in which amino acid or peptide any functional group in the side chain which must be protected is protected by a group that can be split off by means of acids, in different steps one or more amino acids in which the α-amino group is protected by the sulfenyl group and any functional group of the side chain is protected by a protecting group that can be eliminated by means of an acid, the improvement which comprises that each time an amino acid is fused on, the sulfenyl group is eliminated by a member selected from the group consisting of an organic compound of the formula

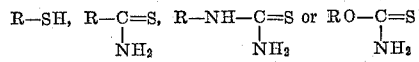

in which R is a member selected from the group consisting of hydrogen, lower alkyl, monocyclic aromatic hydrocarbon and each of said groups substituted by at least one member selected from the group consisting of mercapto, hydroxy, carboxy and lower alkoxy, and an inorganic compound selected from the group consisting of thiosulfuric acid, hydrogen sulfide, thiocyanic acid, hydrocyanic acid, hydrazoic acid and an alkali metal salt of hydroiodic acid.

20. Process as claimed in claim 19, wherein the sulfenyl group is split off by means of a compound selected from the group consisting of thioacetamide and thiourea.

References Cited

Meienhofer: Nature 205, 72–75 (1965).
Reid: Organic Chemistry of Bivalent Sulfur, vol. I, New York, Chemical Publishing Co., pp. 279–284 (1958).

LEWIS GOTTS, *Primary Examiner.*

M. M. KASSENOFF, *Assistant Examiner.*